(12) United States Patent
Graham

(10) Patent No.: US 10,676,960 B2
(45) Date of Patent: Jun. 9, 2020

(54) REFILLABLE DOOR HANDLE

(71) Applicant: Ian Graham, Glasglow (GB)

(72) Inventor: Ian Graham, Glasglow (GB)

( * ) Notice: Subject to any disclaimer, the term of this patent is extended or adjusted under 35 U.S.C. 154(b) by 0 days.

(21) Appl. No.: 16/343,376

(22) PCT Filed: Oct. 10, 2017

(86) PCT No.: PCT/GB2017/053143
§ 371 (c)(1),
(2) Date: Apr. 18, 2019

(87) PCT Pub. No.: WO2018/073579
PCT Pub. Date: Apr. 26, 2018

(65) Prior Publication Data
US 2019/0249455 A1    Aug. 15, 2019

(30) Foreign Application Priority Data

Oct. 18, 2016 (GB) .................................. 1617656.2
Sep. 6, 2017 (GB) .................................. 1714355.3

(51) Int. Cl.
*E05B 1/00* (2006.01)
*A01N 25/34* (2006.01)

(52) U.S. Cl.
CPC ............ *E05B 1/0069* (2013.01); *A01N 25/34* (2013.01)

(58) Field of Classification Search
CPC ... A01N 25/34; A61L 2/00; A61L 2/16; A61L 2/18; A61L 2/26; A61L 2202/10; A61L 2202/15; E05B 1/0069
See application file for complete search history.

(56) References Cited

U.S. PATENT DOCUMENTS 9,855,361 B2 * 1/2018 Banco ..................... A61L 9/125
2002/0041824 A1   6/2002 Dawson
(Continued)

FOREIGN PATENT DOCUMENTS

| BE | 1015999 | 1/2006 |
|---|---|---|
| DE | 10014472 | 10/2001 |
| DE | 102009036339 | 11/2010 |

(Continued)

OTHER PUBLICATIONS

Novel technology for door handle design Muirhead, E. et al. Journal of Hospital Infection, vol. 97, Issue 4, 433-434.

*Primary Examiner* — Timothy C Cleveland

(57) ABSTRACT

There is described a handle, for example a door handle, lifting handle or touch pad, which is particularly useful as a self-sterilizing door handle for use in public areas. The handle comprises: a contact area formed of a hydrophilic sintered porous material, particularly a plastic material; and a reservoir containing an anti-microbial liquid, wherein said reservoir is fluidically connected to the contact area. The reservoir can include a port to allow the reservoir to be re-filled or alternatively the whole reservoir can be detached and replaced when required. The anti-microbial liquid can be delivered along the hydrophilic sintered porous material by fluid transmission action so that the contact area is continually treated by the anti-microbial liquid, thereby rendering the handle continuously wetted and disinfected and inhibiting the growth of culture forming units.

20 Claims, 8 Drawing Sheets

(56) References Cited

U.S. PATENT DOCUMENTS

2010/0294806 A1    11/2010   McDowell
2013/0206054 A1     8/2013   Vicente

FOREIGN PATENT DOCUMENTS

| DE | 202011105304 | 5/2012 |
|----|--------------|--------|
| EP | 3118395 | 1/2017 |
| GB | 2436284 | 3/2006 |
| GB | 2506386 | 11/2012 |
| GB | 2436284 | 3/2016 |
| WO | WO/2007/107784 | 9/2007 |

\* cited by examiner

REFILLABLE DOOR HANDLE

TECHNICAL FIELD

The present invention relates to a handle, for example a door handle, and specifically to a handle having an external contact surface which is continuously maintained in a hygienic state so that the handle is particularly suited for use in public areas for repeated or multiple users for pushing, pulling, applying torque, providing stability or affording other contact.

BACKGROUND TO THE INVENTION

Hand hygiene is an important aspect in maintaining public health. In communal areas, door handles are touched by large numbers of people and can be responsible for the transfer of disease-causing microbes from person to person, particularly where one or more individuals exercise poor hand hygiene. The likelihood of door handles being responsible for the spread of microbes is particularly high for toilet doors, kitchen doors, public access ways, and for doors in other communal areas, such as doors within buildings used by a large number of people. A single person failing to wash their hands adequately (or at all) will microbially contaminate a door handle (for example a handle of the toilet block) by touching the handle. The deposited micro-organisms can then colonise the handle, and some micro-organisms will inevitably be transferred to the hands of any subsequent person who touches the handle. The risk of microbial transfer via a door handle can be a particular problem in premises providing food, such as cafes and restaurants. An equivalent problem also arises for any contact surface which is touched by multiple people, including, without limitation, push buttons, hand grips, touch pads and the like.

The problem of hand hygiene is often tackled in hospitals by the provision of sanitising hand gel. However, this is not generally available in other buildings or locations and also relies upon compliance by each person, i.e. that each person will remember to use the hand gel before entry. This issue of compliance has been tackled by Altitude Medical Inc. who have created a door handle which automatically dispenses a portion of sanitising hand gel as the handle is pulled (see WO2014/035610). An alternative device is provided by Pure Hold Ltd (see WO2011/128652). However, it is not always appropriate for a sanitising hand gel to be used at every public access way.

WO 2011/042741 describes a cover for a door handle which includes a porous material holding disinfectant which acts as a reservoir. The disinfectant is squeezed through the cover when the porous material is compressed, for example by a user holding the handle. However, the device described has the disadvantage that squeezing the porous material too hard will result in too much disinfectant being expelled, and in some cases can lead to disinfectant dripping out of the device in an undesirable manner. Additionally, the porous material is inappropriate for areas of high use, where wear and tear would cause the material to degrade.

GB2506386A describes an apparatus specifically for use with a door which comprises a grip portion of the handle being configured to offer the user a partially disinfected surface. However, this arrangement would not provide the necessary protection for the user.

SUMMARY OF THE INVENTION

There remains a need to prevent the spread of microbial contamination between surfaces and multiple users.

The present invention seeks to address the above problems by providing a handle which is self-disinfecting. The handle is suitable for mounting on a door or other article such that a person wishing to open or close the door or to move the article will touch the handle.

The term "handle" as used herein refers to any shape or design of mounted fixture which is designed to be touched by a human hand. The term includes rotating handles, fixed and grip handles of the type conventionally attached to a door, but also includes push buttons, handles or grips for other articles, for example handles for apparatus such as machinery, for example for machinery for food preparation, keep fit or gym equipment and the like, as well as apparatus or equipment for transportation, lifting or storage (for example storage boxes or containers, or shopping trolleys) and any other contact surface which may be touched by multiple people during normal use (e.g. banisters). For the avoidance of doubt, this term also includes "push panels" i.e. planar members attached to a surface (such as a door) which define a specific area intended to be touched by hand in order to move the article, fixture or surface to which they are attached. The term includes fixed, rotating and static handles, grips, touch pads etc. of any size or any ergonomic or geometric arrangement and installed in any configuration, orientation or azimuth.

The present invention thus provides a handle comprising:
i. a contact area which is substantially formed of a hydrophilic sintered porous material; and
ii. a reservoir for holding an anti-microbial liquid, wherein in use said reservoir is fluidically connected to the contact area by the hydrophilic sintered porous material.

The reservoir can optionally include a window to view the amount of anti-microbial liquid within the reservoir.

Optionally the reservoir is releasably detachable from the handle. For example an empty reservoir can be replaced by a filled reservoir.

The contact area is substantially formed of the hydrophilic sintered porous material, for example is completely formed of the hydrophilic sintered porous material.

In use, the hydrophilic sintered porous material extends into the reservoir thereby contacting any anti-microbial liquid held therein.

Optionally, the handle further includes anti-microbial fluid within the reservoir.

In a further aspect, the present invention provides a handle comprising:
i. a contact area which is substantially formed of a hydrophilic sintered porous material; and
ii. a reservoir containing an anti-microbial liquid, wherein said hydrophilic sintered porous material extends into the reservoir for contact with the anti-microbial liquid.

The reservoir can optionally include a window to view the amount of anti-microbial liquid within the reservoir.

Optionally the reservoir is releasably detachable from the handle. For example an empty reservoir can be replaced by a filled reservoir.

The contact area is substantially formed of the hydrophilic sintered porous material, for example is completely formed of the hydrophilic porous material.

In a further aspect, the present invention provides a kit, said kit comprising:
i. a handle as described above; and
ii. an anti-microbial liquid suitable to be held within the reservoir and which is able to permeate through at least part of the hydrophilic sintered porous material when in fluid connection therewith.

Optionally the anti-microbial liquid is held within a suitable separate container. The container will include a suitable port permitting the anti-microbial liquid to be transferred into the reservoir. Alternatively the anti-microbial liquid is held within the reservoir.

In a yet further aspect, the present invention provides a separate container holding an anti-microbial liquid, said liquid when in fluid connection with the hydrophilic material of the handle as described above is able to permeate through at least part of the hydrophilic sintered porous material, and wherein said container has an outlet which is adapted for engagement with a port of the handle reservoir. The mating engagement between the container outlet and reservoir port is generally such that spillage of the liquid is prevented.

DETAILED DESCRIPTION OF THE INVENTION

Figure 1:
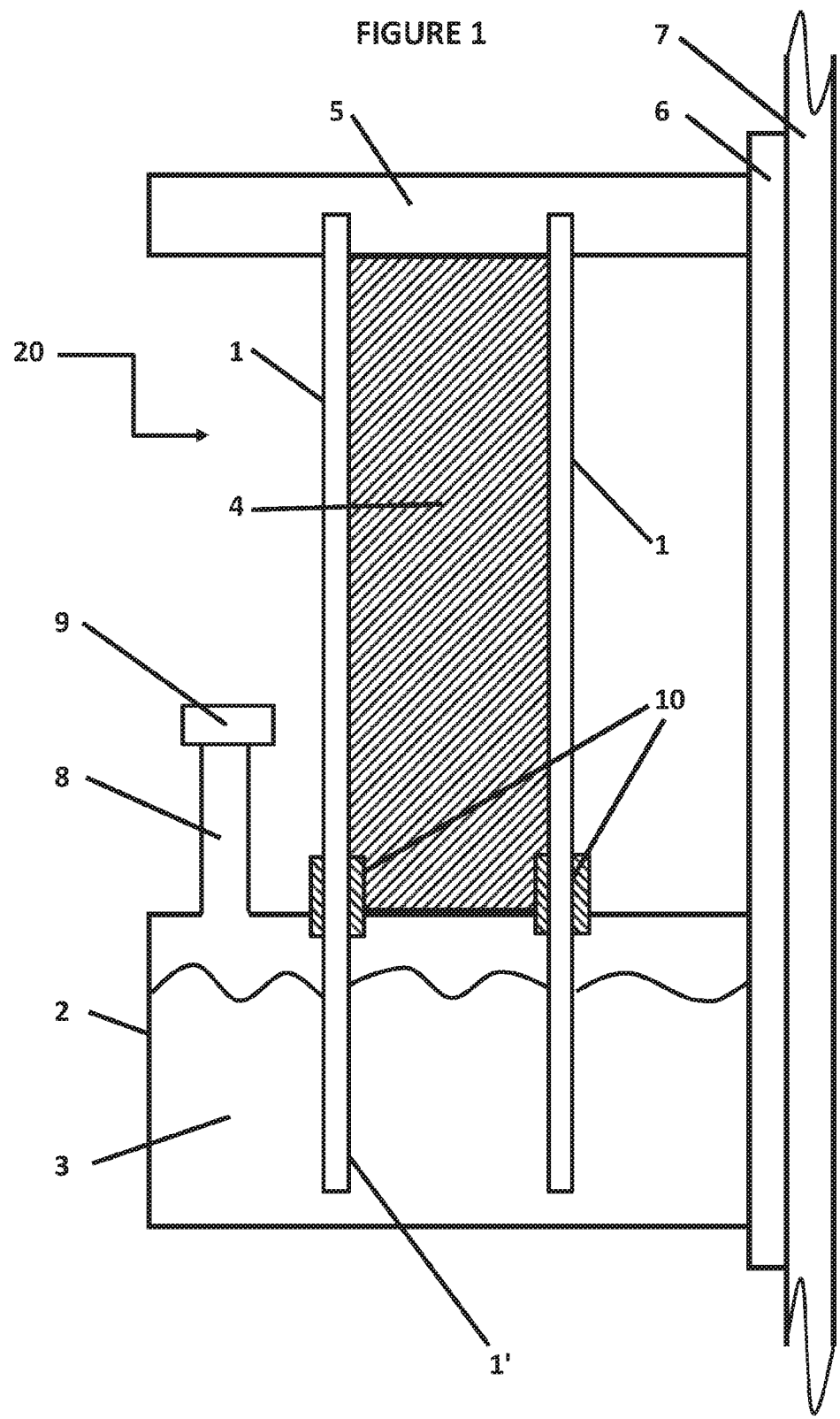
FIG. 1 is a cross-sectional view of a first embodiment of the present invention.

The handle of the present invention is now described in further detail.

Contact Area

The term "contact area" as used herein refers to the part of the handle which, during normal use, is touched by a person who is using (usually pressing, pushing, pulling or applying torque, but also including simply touching or holding) the article to which the handle is attached. The contact area will therefore form part of the outer surface of the handle. As noted above, the handle of the present invention may be attached to a door, for example the door of a building, room or corridor. However the handle of the invention may also be useful for other articles, for example could be attached to a cupboard or the like, or could be in the form of a toilet flush handle or could form a grip or lever on a machine or other piece of equipment (for example equipment for food production, or any other communal equipment, for example gym or keep-fit equipment such as stationary bicycles, cross-trainers etc.) or could form a handle on an article for storage or transport, for example apparatus or equipment for transportation, lifting or storage (for example storage boxes or containers, or shopping trolleys) and any other contact surface which may be touched by multiple people during normal use (e.g. banisters).

In the present invention, at least part of the contact area is formed from a hydrophilic porous material. The hydrophilic porous material is a sintered material. The hydrophilic sintered porous material can be a substantially non-compressible material. For example, the hydrophilic sintered porous material can be substantially non-compressible by hand (that is to say is substantially non-compressible when gripped by a user during normal use). The hydrophilic sintered porous material can be non-compressible when gripped by a user during normal use. For example, the hydrophilic sintered porous material can be substantially non-compressible to compressive loads up to at least 1 MPa, for example 2 MPa, or at least 3 MPa (that is to say is substantially non-compressible when gripped by a user during normal use typically employing compressive force up to 50 KPa). Generally, a sufficient proportion of the contact area of the handle is formed from the hydrophilic sintered porous material, such that in normal use, a user will only come into contact with the hydrophilic sintered porous material, i.e. will touch the handle via the hydrophilic sintered porous material without touching any other parts of the handle.

Optionally, the hydrophilic sintered porous material forms substantially all of the contact area of the handle (i.e. the outer surface incorporated into the handle which it is desirable to disinfect), preferably all of the contact area of the handle. The hydrophilic porous material can conveniently be a plastic material, for example a non-compressible plastic and is a sintered material, for example formed from plastic beads which are sintered together to form a porous material.

Optionally, the hydrophilic sintered porous material is planar and is used to cover other components of the handle thereby forming an outer surface of the handle. Optionally, the hydrophilic sintered porous material covers substantially all of the contact area of the handle. Alternatively the hydrophilic sintered porous material is in the form of a thin layer of any suitable shape (e.g. cylindrical or elliptical) which can optionally be placed (for example fitted and incorporated) into the handle to form an outer surface of the handle which is presented to the user. The hydrophilic sintered porous material can be manufactured separately and then cut to shape and fitted over the handle component(s) as required. Alternatively the hydrophilic sintered porous material could be formed in situ as a coating, for example by 3D printing or by chemical deposition or by other suitable means. Having the hydrophilic sintered porous material in the form of an external layer on the handle helps to minimise the amount of anti-microbial liquid held within the contact area of the handle, which reduces weight. There is no specific minimum thickness for the hydrophilic sintered porous material, but typically a thickness of 0.5 mm to 5 mm would be appropriate, for example 1 to 2.5 mm.

The hydrophilic sintered porous material may have a homogeneous pore size throughout. Alternatively, the porosity of the hydrophilic sintered porous material may vary, for example to take account of the effect of gravity once the handle is mounted on the door and is in use. Thus the pore size can vary in a graduated manner across at least one dimension of the contact area.

The hydrophilic porous material can be formed with an open pore structure, for example with a sintered pore structure. The hydrophilic material can be a plastics material having an open pore structure, which can conveniently be formed from sintering plastics beads. Beads of diameter 20 μm to 200 μm could be used, for example 20 μm to 100 μm.

The material can be suitably manufactured and may be treated to ensure hydrophilic properties of the material, for example can be surface treated or coated to provide hydrophilic functional chemical groups, such as hydroxyl groups, carbonyl groups (e.g. aldehydes and ketones), carboxyl groups (e.g. carboxylic acids), amino groups, sulfhydryl groups (e.g. thiols), phosphate groups or the like.

In one embodiment, the hydrophilic sintered porous material used in the present invention is able to absorb liquid from the reservoir and transport that liquid through the hydrophilic sintered porous material and thus along its surface by capillary action.

Porous plastics materials are naturally hydrophobic (water repellent) however, this material property can be modified during the manufacturing process to ensure a hydrophilic nature allowing absorption of aqueous solutions into and through the material. This property change is caused by supplementary specific additives typically an ionic coating of the particles of the plastic materials to encourage the attraction of polar moieties within the aqueous solution, thus inducing full liquid-state fluid transfer through the material. This hydrophilic process is most efficiently achieved using sintered bead porous plastics with a defined pore size matched to the fluid attributes.

Porous plastics materials are typically manufactured in fibre wick or blown foam form. These porous plastics display different pore size consistency affecting the material's ability to absorb and transfer fluids. Inconsistent pore sizes are a feature of both the fibre and foam formed porous materials where voids and cavities of random size appear. Thus, the variation in pore size within a fibre wick or blown foam porous materials causes these materials to transfer fluids in an un-even and inconsistent manner meaning that these materials would not provide a uniformly disinfected contact surface area being detrimental to the user. However, we have found that a porous material of formed from sintered beads has a pore size based on both the bead size and the bonding between the beads. This allows an accurate pore size to be maintained throughout the material volume. In this way, the transfer of fluid through the plastic material can be controlled. Sintered bead porous materials, of a defined pore size, will provide an even distribution of fluid across the outer contact surface of the material. The use of sintered bead porous material means that the handle can be used with even distribution of fluid across the surface.

Generally, the fluid transfer action is inversely related to pore size of the hydrophilic sintered porous material. In the present invention, the hydrophilic sintered porous material has a pore size suitable to ensure that the anti-microbial liquid is conducted across at least a portion of the hydrophilic sintered porous material forming the contact area, for example the liquid is conducted across and permeates substantially all of the hydrophilic sintered porous material forming the contact area of the handle. It can be advantageous for the anti-microbial liquid to be conducted across all of the hydrophilic sintered porous material forming the contact area of the handle so that, where ever the contact area is touched, the user will come into contact with the anti-microbial liquid. The anti-microbial liquid can thus be delivered along the hydrophilic sintered porous material so that the contact area is continually and evenly wetted by the anti-microbial liquid, thereby rendering the contact area treated. The pore size of the hydrophilic sintered porous material is thus selected to ensure that the anti-microbial liquid is conducted across the required portion of the contact area (for example is conducted across substantially all of the contact area). A hydrophilic sintered porous material having a pore size of 0.2 mm to $1\times10^{-5}$ mm is suitable, for example 20 μm to 200 μm, for example 20 μm to 150 μm. One convenient pore size range for the hydrophilic sintered porous material is 40 μm to 100 μm. An alternative suitable pore size range is 20 μm to 100 μm or 50 μm to 100 μm.

The hydrophilic sintered porous material can conveniently be substantially non-compressible. For example, the hydrophilic sintered porous material can be substantially non-compressible by hand resistant to compressive loads up to at least 1 MPa, for example 2 MPa, or at least 3 MPa (that is to say is substantially non-compressible when gripped by a user during normal use typically employing compressive force up to 50 KPa). The hydrophilic sintered porous material can be non-compressible when gripped by a user during normal use.

The hydrophilic sintered porous material is formed of a material which is durable enough to allow repeated use by multiple users over a significant period of time (e.g. six months or longer) without deterioration in the material. Thus, the present invention has an advantage over prior art devices using less robust materials, for example fabrics.

Optionally, the hydrophilic sintered porous material can interact with a liquid with a relative polarity of at least 0.5 (relative to water), for example a relative polarity of at least 0.6, for example of at least 0.8. Preferably the liquid is an aqueous solution or aqueous dispersion.

The hydrophilic sintered porous material is advantageously a plastics material suitably manufactured and treated to ensure hydrophilic properties of the material. Suitable materials are available commercially, for example from Porex Corporation (Fairbum Ga., US), Polystar Technologies (Minnesota, US) and Porvair (Hampshire, UK). The hydrophilic sintered porous material can be a thermoplastic material. Examples of suitable materials include polyester (PET), polyethylene (PE), ultra-high molecular weight polyethylene (UHMWPE), high-density polyethylene (HDPE), polypropylene (PP), polytetrafluoroethylene (PTFE), and polyvinylidene fluoride (PVDF), ethylene vinyl acetate (EVA), polyethersulfone (PES), polyurethane (PU) and PE/PP co-polymer and like materials.

Optionally the hydrophilic sintered porous material is a metal or metal alloy and manufactured to ensure the hydrophilic properties of the material. For example the hydrophilic sintered porous material could be a non-ferrous steel material such as stainless steel. Alternatively the hydrophilic sintered porous material could be a titanium or titanium alloy. The metal or metal alloy could be formed into the hydrophilic sintered porous material by any suitable means, including 3D printing or by sintering a powder (e.g. an alloy powder) into the required shape and treating to ensure the hydrophilic properties of the material.

The handle of the present invention includes at least one reservoir for holding the anti-microbial liquid. Each reservoir will be formed in a fluid-tight and leak-proof configuration. Optionally, the handle of the present invention can include more than one reservoir, for example can include two or three reservoirs or even more. The size of the or each reservoir is not particularly critical but conveniently the total volume of the reservoir(s) will be able to contain a quantity of anti-microbial liquid sufficient to keep the handle continuously treated for a pre-determined period of time. The length of time taken to evaporate a given volume of the liquid and hence the volume of anti-microbial liquid required for operation of the handle will of course also depend on the environment in which the handle is to be used, for example the ambient temperature and humidity, as well as the number of people using the handle over a particular time period. Where two or more reservoirs are present, these need not be identically sized or shaped. Where two or more reservoirs are present, each reservoir can optionally be independently fluidically linked to the hydrophilic sintered porous material. For example a first reservoir could be fluidically linked to a first portion of the hydrophilic sintered porous material and a second reservoir fluidically linked to a second portion of the hydrophilic sintered porous material. Alternatively a first reservoir could be the primary reservoir which is fluidically linked to the hydrophilic sintered porous material and any further secondary reservoirs feed into the primary reservoir, for example to top it up. Connections between the primary reservoir and any such secondary reservoirs can be by any conventional and fluid-tight and leak proof means of fluid transfer, including by pump, gravity feed or fluid balance.

In one embodiment, at least one reservoir(s) (optionally each reservoir) will include a port to allow it to be refilled with the anti-microbial liquid. Conveniently, the or each port includes a closure member. The closure member will reduce unwanted evaporation and/or spillage of the anti-microbial liquid. Optionally the closure member can be secured or is lockable to restrict access to the reservoir contents, particularly to make access to the reservoir child-proof. Suitable tamper-proof members include a screw, a push-fit fitting, a lock or the like.

Conveniently the reservoir can be re-filled from a container of anti-microbial liquid. Optionally, the container is specifically adapted for use with the handle of the present invention. In one embodiment, at least one reservoir of the handle has a port which is sized and shaped to co-operate and mate with an outlet of the container. Particularly, at least one reservoir of the handle can have a port which is sized and shaped to co-operate and mate with the container outlet in a manner such that transfer of the anti-microbial liquid can be conducted with minimal (preferably no) spillage. For example, the container outlet can engage in a sealing manner with the reservoir port.

In an alternative embodiment, the reservoir (or any or each of them) is releasably detachable from the handle. Accordingly an empty reservoir can be removed from the handle and a replacement full reservoir containing anti-microbial liquid can be attached to the handle in its place. Thus, the reservoir(s) can be replaced in a "cassette"-type manner. Alternatively the reservoir may be removed from the handle simply to facilitate easy re-fill of the reservoir with an appropriate volume of anti-microbial liquid or for the purpose of cleaning or maintenance. Thus the present invention also provides a container holding an anti-microbial liquid able to be conducted through the hydrophilic sintered porous material of a handle as described above, wherein said container has is configured to releasably engage with said handle.

Optionally, the port to refill the reservoir may only be accessible once the reservoir has been detached from the handle.

Optionally, the reservoir need not be fully detachable from the handle, for example the reservoir may be moved from a first position where the port to refill the container is not accessible to a second position where the port to refill the reservoir is accessible. As an example, the reservoir may be slid out from its usual operative position (the first position) in the handle, in which the port for the reservoir is not accessible, to a second position where the reservoir is at least partially detached or is fully detached from the handle such that the reservoir port is then accessible for refilling. Once the reservoir has been refilled, it is then slid back into its first (operative) position. The reservoir may alternatively be moved from the first position to the second position (and vice versa) by rotation.

Optionally, a reservoir which is attached to the handle can be further locked into position to prevent its unauthorised or unintended removal therefrom. A replaceable reservoir adapted for releasable engagement with the handle as described above forms a further aspect of the present invention.

During use, the anti-microbial liquid will be gradually used up due to the transfer of small quantities of the liquid onto the hand(s) of each user and/or by evaporation. Accordingly, the handle of the present invention will need to be refilled at regular intervals, either by refilling the reservoir or by replacement of a releasably engagable reservoir with a filled reservoir. It can be beneficial for at least one reservoir to include an indicator means which shows the amount of anti-microbial fluid remaining within the reservoir. The indicator means could be, for example, a floating level indicator. Alternatively the indicator means could be a viewing window allowing the remaining volume of anti-microbial liquid to be conveniently inspected.

As noted above, it is essential for the hydrophilic sintered porous material to be fluidically connected to the anti-microbial liquid within at least one reservoir. This fluidic connection can conveniently be achieved by at least a portion of the hydrophilic sintered porous material extending into the reservoir interior thereby contacting the anti-microbial liquid held therein. To avoid spillage and minimise evaporation, the hydrophilic sintered porous material can pass through an opening in the reservoir via a reservoir sealing member. The reservoir sealing member can be made of any suitable resilient material, for example can be of rubber or silicone, and will form a fluid-tight seal between the internal volume of the reservoir and the exterior of the hydrophilic sintered porous material where it passes through the reservoir sealing member. Advantageously, at least a portion of the hydrophilic sintered porous material may extend across the reservoir from one side to an opposite side, such that the hydrophilic sintered porous material can remain in contact with the anti-microbial liquid even if only a small volume of the liquid remains within the reservoir. Thus the hydrophilic sintered porous material will enter the reservoir at the opening (through the reservoir sealing member), where the opening is located on a first side of the reservoir. The hydrophilic sintered porous material then extends across the reservoir interior to a second side of the reservoir, wherein the first and second sides are opposite each other. In one embodiment, the first side is the uppermost side when the handle is mounted on a vertical surface (that is, is the side positioned at the highest point), and the second side is the lowermost side when the handle is mounted on a vertical surface (that is, is the side positioned at the lowest point). It is not essential for the hydrophilic sintered porous material to contact the liquid across the whole width of the material or reservoir. Conveniently a narrower section of the hydrophilic sintered porous material can enter the reservoir for contact with the liquid. For example a portion of hydrophilic sintered porous material having a width which is approximately one tenth (for example one eighth, one fifth, a quarter, a third or a half) of the width of the material as used on the contact area of the handle may be sufficient. Generally it is convenient for the narrower section of the hydrophilic sintered porous material to be located centrally, but this is not essential and the narrower section can be located towards one edge of the material or at one edge of the material.

The anti-microbial liquid can be any liquid having an anti-microbial action. The term "anti-microbial" is used herein to refer to an ability to induce microbial stasis and/or microbial death. In one embodiment the anti-microbial liquid is anti-bacterial. Advantageously the liquid is microcidal, for example is bactericidal, but this is not essential. The present invention is not limited to specific anti-microbial agents or microcides, but the agents used will be suitable for contact with human skin. In one embodiment, the antimicrobial liquid prevents the growth and/or combats infection by one or more of the following bacteria: *E coli, Salmonella* sp., *Staphylococcus* sp. (for example *Staphylococcus aureus*, such as MRSA), *Campylobacter* sp., *Pseudomonas* sp., for example *Pseudomonas aeruginosa* and *Listeria* sp. In one embodiment the anti-microbial liquid combats the growth and/or spread of viruses such as influenza A (e.g. H1N1), coronavirus (common cold), norovirus (winter vomiting) and/or Human respiratory syncytial virus (RSV). In one embodiment the anti-microbial agent is also effective at removing allergens such as pollen, dust mite and animal dander. In one embodiment the anti-microbial agent is a disinfectant, for example a disinfectant suitable for domestic or commercial use. In one embodiment the anti-microbial agent is a sanitizer. In one embodiment the anti-microbial is electrolysed water. Generally, the anti-microbial liquid is GRAS (Generally Recognized As Safe). Optionally the anti-microbial liquid is non-irritant to skin. Optionally, the anti-microbial liquid does not contain bleach. Optionally, the anti-microbial liquid is odourless and taint-free. Suitable anti-microbial agents include a benzalkonium salt (for example a chloride salt) which can be present in an amount of from 0.05 to 3.0 g per 100 g liquid, for example from 0.07 to 1.2 g per 100 g liquid, such as 0.08 to 1.0 g per 100 g liquid. Specific examples of suitable benzalkonium salts include stearalkonium chloride and didecyldimethyl ammonium chloride. The anti-microbial agent can be a liquid, for example chloxylenol (para-chloro-meta-xylenol), preferably a liquid which is miscible with water. The anti-microbial liquid can be a solution of an anti-microbial agent, for example a solution in water or other solvent. Advantageously the anti-microbial liquid is water-based, i.e. is an aqueous solution of an anti-microbial agent. The anti-microbial liquid can conveniently be formed by dissolution of a solid (for example in tablet or powder form) within a solvent, for example water. In this embodiment, a user need only insert the required amount of solid into the reservoir and top up the reservoir with water. Alternatively, the anti-microbial liquid could be formed by dilution of a concentrate with a suitable diluent, for example water. The concentrate could be in the form of a gel or liquid. For some end uses, the solids content of the liquid is determined to ensure that pores within the hydrophilic sintered porous material do not become blocked during use. For example, the dissolved salt content of the anti-microbial liquid can be selected to minimise crystallisation of the salts upon the hydrophilic sintered porous material during use which may cause blockage of the pores within the hydrophilic sintered porous material. Since the liquid is anti-microbial, the liquid inhibits the growth of culture forming units on the contact area of the handle.

Since the invention requires the liquid to be delivered along at least a portion of the hydrophilic sintered porous material (preferably all of the hydrophilic sintered porous material), the liquid will have a fluid viscosity which enables the liquid to be distributed as required. For example, the fluid viscosity is suitable for transmission by capillary action at the hydrophilic sintered porous material in a controlled manner wherein the fluid will provide wetting or disinfecting evenly and consistently across the whole of the touchable surface contact area. Suitable exemplary fluid dynamic (absolute) viscosity values range from 0.0008 to 0.003 $Ns/m^2$, for example range from 0.001 to 0.003, for example from 0.001 to 0.0025 or from 0.001 to 0.002 $Ns/m^2$.

Optionally, the anti-microbial liquid can be colourless. Alternatively, the anti-microbial liquid can be coloured, for example can include a dye or pigment. Inclusion of a dye or pigment may help to allow the level of the liquid remaining in a reservoir to be easily seen.

Optionally, the anti-microbial liquid can include one or more other additives (i.e. ingredients which are present in addition to the anti-microbial agent). For example, the anti-microbial liquid can include a fragrance or perfume. For example, the anti-microbial liquid can include an additive which is beneficial for skin care, for example a skin moisturizer.

The handle of the present invention can include other components, for example can include supporting or mounting components which are required to mount the handle onto or integrated with a surface, mechanism, article or facility for use. The mounting components(s) will be attached to a door or other object or article by suitable fastening means as used within the art, for example for screws, adhesive or the like. In one embodiment the mounting components are attached to the handle via the reservoir. In one embodiment, the handle of the present invention is releasable detachable from the mounting component(s) such that the handle can be detached from the door or other object/article to which the mounting components have been attached. This can facilitate replacement of the whole handle and/or facilitate easy re-fill of the reservoir with an appropriate volume of anti-microbial liquid or allow cleaning and maintenance of the handle. The mounting components can be formed from any suitable material and mention can be made of metals or metals alloys (e.g. non-ferrous steel), wood or plastic.

The term "comprising" as used herein means consisting of, consisting essentially of, or including and each use of the word "comprising" or "comprises" can be independently revised by replacement with the term "includes", "consists essentially of" or "consists of".

Preferred or alternative features of each aspect or embodiment of the invention apply mutatis mutandis to each aspect or embodiment of the invention (unless the context demands otherwise).

All documents referred to herein are incorporated by reference. Any modifications and/or variations to described embodiments that would be apparent to one of skill in art are hereby encompassed. Whilst the invention has been described herein with reference to certain specific embodiments and examples, it should be understood that the invention is not intended to be unduly limited to these specific embodiments or examples.

The present invention will now be further described with reference to the figures.

FIG. 1 shows a cross-section of a first embodiment of the present invention. The first embodiment illustrated is in the form of a pull handle 20. Handle 20 includes a contact area which is the part of handle 20 adapted and intended to be touched by a user during normal use. The contact area is sized and shaped to be gripped by a user's hand. The contact area is formed from hydrophilic sintered porous material 1 which can be formed from a substantially non-compressible plastics material. The hydrophilic sintered porous material 1 is located such that the user will only touch the hydrophilic sintered porous material 1 during normal use. Generally the contact area formed using the hydrophilic sintered porous material 1 will be ergonomically profiled and sized to form a comfortable fit for a person's hand. The handle 20 will be mounted on a mounting surface 7 via a mounting or fixing bracket 6 at a suitable and convenient height for use. As illustrated the handle 20 is shown mounted on surface 7 in a vertical arrangement. However handle 20 could also be fitted to be in any other suitable way, for example could be mounted horizontally.

Hydrophilic sintered porous material 1 can have a pore size of 40 to 100 μm and can conveniently be formed of polyethylene. The pore size in this embodiment is substantially uniform throughout the material, but in other embodiments the pore size may be varied in different sections of the hydrophilic sintered porous material.

As illustrated, the hydrophilic sintered porous material is present only as an outer layer, with a support 4 being located in the interior. Support 4 can be formed of any convenient material, for example may be of wood, plastic or metal.

In the handle 20 of FIG. 1, the support 4 is located between an end support member 5 and a reservoir 2. In this embodiment, the hydrophilic sintered porous material 1 extends beyond the upper end of the vertical support 4 to partially penetrate into the end support member 5. The hydrophilic sintered porous material 1 also extends beyond the lower end of the vertical support 4 to pass through the wall of the reservoir 2 via reservoir seals 10 into the interior of the reservoir 2. Reservoir sealing member 10 is formed from a resilient material and provides a fluid-tight connection. The reservoir 2 can be formed from any suitable material able to hold a liquid without leakage. Plastic is one such suitable material. Reservoir 2 includes a port 8 which can be closed using closure member 9. Closure member 9 can be removed to allow filling or re-filling or reservoir 2 with an anti-microbial liquid 3 or may be opened for cleaning or maintenance purposes. Optionally, the closure member 9 may be secured or lockable to restrict access to the reservoir. As illustrated, reservoir 2 is shown partially filled with an anti-microbial liquid 3, so that handle 20 is ready for use. The hydrophilic sintered porous material 1 (or a narrower portion thereof) extends into the reservoir 2 so that its ends 1' are below the surface of the anti-microbial liquid 3. Thus, ends 1' are within the volume of anti-microbial liquid 3 such that the anti-microbial liquid 3 is drawn into the hydrophilic sintered porous material 1 and is delivered upwardly by capillary action so that substantially the whole of the hydrophilic sintered porous material 1 is wetted by the anti-microbial liquid 3.

Figure 2:
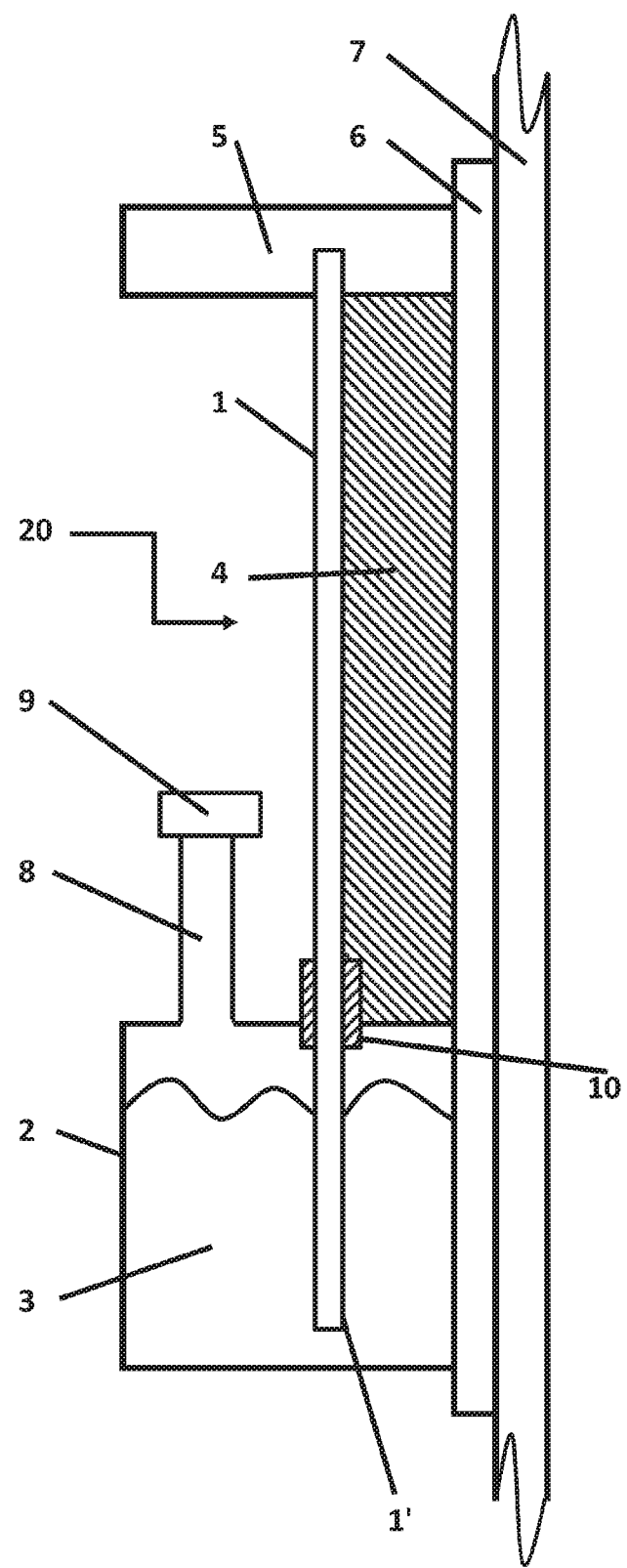
FIG. 2 is a cross-sectional view of a second embodiment of the present invention.

A second embodiment is shown in FIG. 2 in cross-section and is in the form of a push-panel located on a mounting surface 7 and affixed thereto via a re-useable mounting or fixing bracket 6. Optionally mounting bracket 6 may be integral with the reservoir or may be integral with the handle. As with FIG. 1, handle 20 can also be mounted in other orientations. In this embodiment, the handle 20 has a single contact area which can be touched by a user and in this embodiment is formed with a single planar sheet of hydrophilic sintered porous material 1. Hydrophilic sintered porous material 1 can have a pore size of 20 to 100 μm, for example 40 to 100 μm, and can conveniently be formed of polyethylene beads sintered together. Alternatively, hydrophilic sintered porous material 1 can be formed from sintered stainless steel beads, again preferably having a pore size of 20 to 100 μm, for example 40 to 100 μm.

As illustrated, the hydrophilic sintered porous material is present only as an outer layer, with a support 4 being located in the interior. Support 4 can be formed of any suitable material(s), for example may be of wood, plastic or metal or any combination thereof.

As noted in FIG. 1 the contact area is formed of a hydrophilic sintered porous material 1 able to conduct anti-microbial liquid 3 across its surface by capillary action. As illustrated, the reservoir 2 shown in FIG. 2 contains a volume of anti-microbial liquid 3. The reservoir includes a port 8, which as shown is fastened with a closure member 9. As illustrated closure member 9 is a simple seal or plug formed of a resilient material, but other closure members could alternatively be used. Closure member 9 can be independently detached from port 8, to enable reservoir 2 to be refilled or topped up with anti-microbial liquid 3 via port 8 or may be opened for cleaning or maintenance purposes. Optionally, the closure member 9 may be secured or lockable to restrict access to the reservoir. Closure member 9 can then be re-located to seal port 8 during normal use of handle 20. Optionally end support member 5 may also be replaced with a reservoir having a respective port and closure member.

The anti-microbial liquid 3 can be any suitable liquid which has a viscosity suitable to allow it to be conducted across the hydrophilic sintered porous material 1 by capillary action. The dynamic (absolute) viscosity can be in the range of 0.0008 to 0.003 Ns/m$^2$, for example 0.001 to 0.003 Ns/m$^2$. As illustrated, hydrophilic sintered porous material 1 is in the form of a surface layer of a planar member or membrane having a thickness of approximately 2 mm to 3 mm. The hydrophilic sintered porous material 1 can have pore size of 1 to 200 μm (for example 20 to 150 μm) and can be formed of any suitable material, for example a plastics material such a polyethylene. The section of the hydrophilic sintered porous material 1 spanning between end support 5 and the reservoir 2 forms the contact area of handle 20, whilst the end 1' of the hydrophilic sintered porous material 1 is located within reservoir 2. The support 4 is located between an end support member 5 and a reservoir 2. Optionally, if end support member 5 is replaced with a second reservoir, both ends of the hydrophilic sintered porous material 1 would be located within a reservoir at both of its upper and lower ends.

As illustrated, end 1' of the hydrophilic sintered porous material 1 extends across substantially the whole of the reservoir 2. Thus, end 1' will remain in contact with the anti-microbial liquid 3 even when only a small quantity of the anti-microbial liquid 3 is held within reservoir 2. Reservoir sealing member 10 is formed from a resilient material and provides a fluid-tight connection between the internal (i.e. within the reservoir) and the external hydrophilic sintered porous material. The pore size of hydrophilic sintered porous material 1 is selected so that the anti-microbial liquid 3 can be absorbed and transferred along the hydrophilic sintered porous material 1 upwardly (i.e. against gravity) by capillary action during normal use of handle 20. Hydrophilic sintered porous material 1 enters reservoir 2 via reservoir sealing member 10 which can be formed from a resilient rubber, silicon or closed cell foam seal to provide a fluid-tight connection.

In use, the anti-microbial liquid 3 permeates across hydrophilic sintered porous material 1 to ensure that the contact area of handle 20 is continually wetted by the anti-microbial liquid 3. The anti-microbial activity of liquid 3 immediately combats any micro-organism which is deposited on the handle 20 by a user, thus preventing any subsequent user inadvertently picking up live micro-organisms through use of the handle 20.

Figure 3:
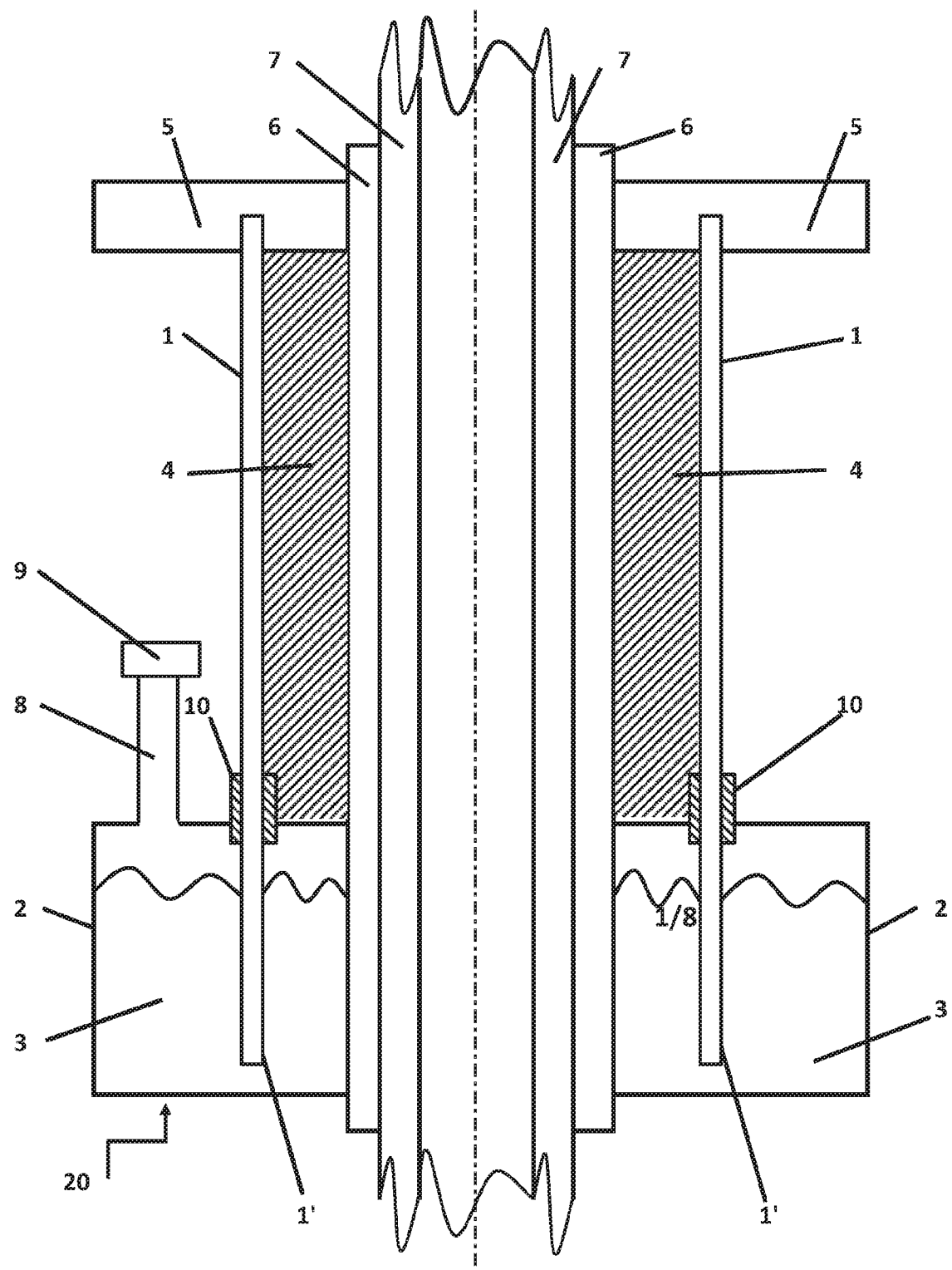
FIG. 3 is a cross-sectional view through a third embodiment of the present invention.

FIG. 3 shows a cross-section of a third embodiment of the present invention. The third embodiment illustrated is in the form of a handle 20 which is mounted around a support member 4 which itself is located on a mounting or fixing bracket onto a strut 7. The centreline of strut 7 is indicated in the figure. This embodiment can therefore be used as part of a handle which can be rotated or forms a "handle-bar" or "banister" style of handle. Handle 20 includes a contact area which is the part of handle 20 adapted and intended to be touched by a user during normal use. The contact area is sized and shaped to be gripped by a user's hand such that the hydrophilic sintered porous material 1 comes into contact with the user's hand. The hydrophilic sintered porous material is located around the entire periphery of the support member 4 in the area spanning between the end support member 5 and the reservoir 2. Hydrophilic sintered porous material 1 can have a pore size of 40 to 100 μm and can conveniently be formed of polyethylene.

As noted in FIG. 1 the contact area is formed of a hydrophilic sintered porous material 1 able to conduct anti-microbial liquid 3 across its surface by capillary action. As illustrated in FIG. 3, the reservoir 2 is shaped to have a central passageway to allow it to be mounted around strut 7. Reservoir 2 contains a volume of anti-microbial liquid 3. The reservoir 2 includes a port 8, which as shown is fastened with a closure member 9. As illustrated, closure member 9 is a simple seal or plug formed of a resilient material, but other closure members could alternatively be used. Closure member 9 can be independently detached from port 8, to enable reservoir 2 to be filled or topped up with anti-microbial liquid 3 via port 8 or may be opened for cleaning or maintenance purposes. Closure member 9 can then be re-located to seal port 8 during normal use of handle 20. Optionally end support member 5 may also be replaced with a reservoir having a respective port and closure member. Optionally, the closure member 9 may be secured or is lockable to restrict access to the reservoir 2.

The hydrophilic sintered porous material and anti-microbial liquid 3 are as described for FIGS. 1 and 2.

End 1' of the hydrophilic sintered porous material 1 extends across substantially the whole of the reservoir 2. Thus, end 1' will remain in contact with the anti-microbial liquid 3 even when only a small volume of the anti-microbial liquid 3 is held within reservoir 2. The pore size of hydrophilic sintered porous material 1 is selected so that the anti-microbial liquid 3 can be absorbed and transferred along the hydrophilic sintered porous material 1 by capillary action during normal use of handle 20. Hydrophilic sintered porous material 1 enters reservoir 2 via reservoir sealing member 10 which can be formed from a resilient rubber, silicon or closed cell foam seal to provide a fluid-tight connection.

In use, the anti-microbial liquid 3 permeates across hydrophilic sintered porous material 1 to ensure that the contact area of handle 20 is continually wetted by the anti-microbial liquid 3. The anti-microbial activity of liquid 3 immediately combats any micro-organism which is deposited on the handle 20 by a user, thus preventing any subsequent user inadvertently picking up live micro-organisms through use of the handle 20.

Figure 4:
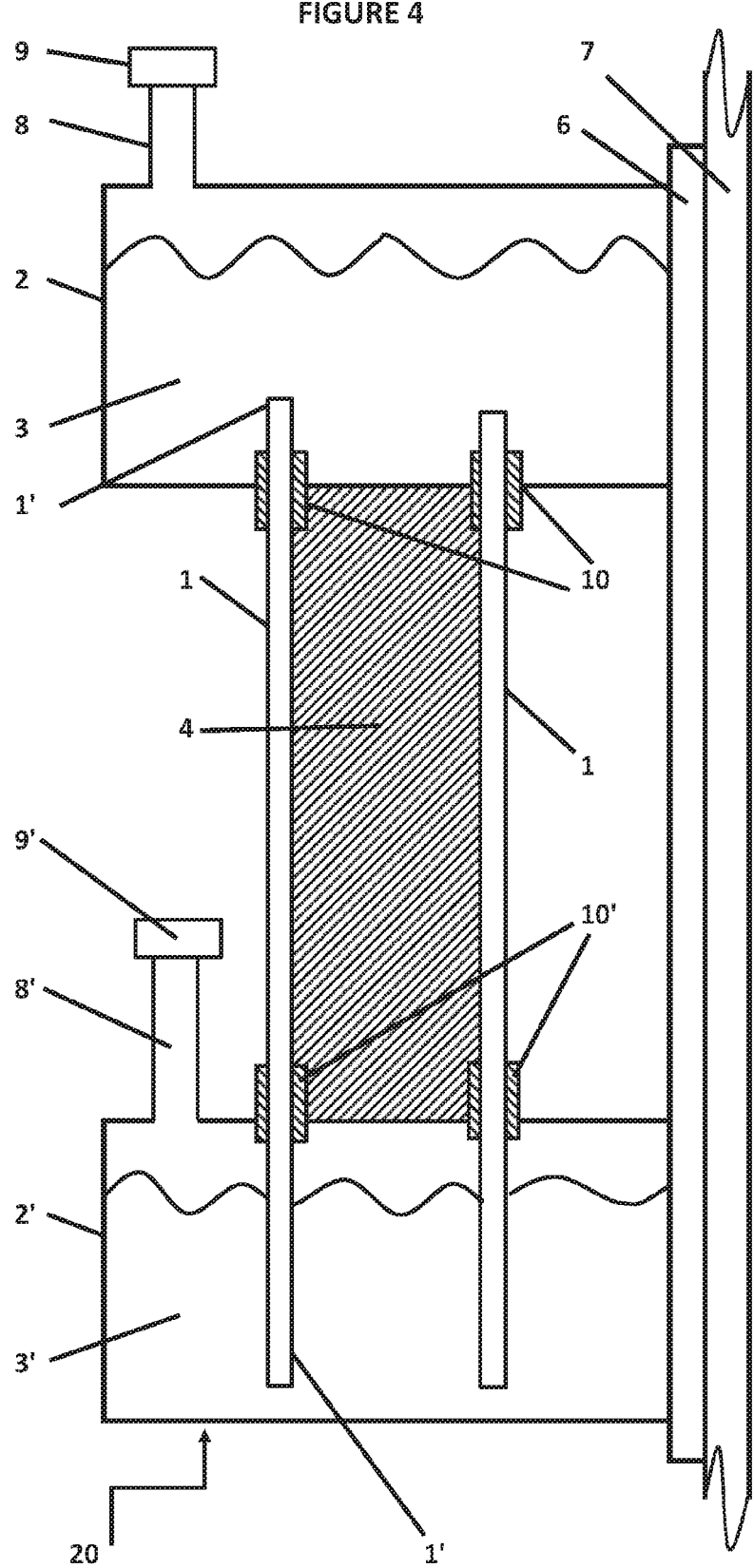
FIG. 4 is a cross-sectional view of a fourth embodiment of the invention having two reservoirs.

FIG. 4 is a further embodiment of the present invention which has two reservoirs. The embodiment illustrated is in the form of a pull handle 20. Handle 20 includes a contact area of hydrophilic sintered porous material 1 which is the part of handle 20 adapted and intended to be touched by a user during normal use. The contact area is the outer surface of handle 20 located between two reservoirs 2, 2'. The handle 20 is shown fixed to a mounting surface 7 (only part is shown, for convenience) by means of a fixing bracket 6 which engages with or optionally is integral with reservoirs 2, 2'. A user intending to move the mounting surface 7 (which may be a door) would grab hold of the middle section of the handle 20, namely the contact area, and push or pull it (and thus the mounting surface 7 to which is it attached) towards or away from them. The contact area is formed from a hydrophilic sintered porous plastics material 1 such that the user will touch the hydrophilic sintered porous material 1 when interacting with the article which comprises the mounting surface 7. Generally the contact area will be sized and shaped ergonomically to form a comfortable fit for a person's hand. The handle 20 will be located on surface 7 at a suitable and convenient height for use. Hydrophilic sintered porous material 1 can have a pore size of 40 to 100 μm and can conveniently be formed of polyethylene.

The contact area is formed of a hydrophilic sintered porous material 1 able to conduct anti-microbial liquid 3, 3' across its surface. As illustrated, the reservoirs 2, 2' shown in FIG. 4 each contain a volume of anti-microbial liquid 3, 3'. Each reservoir 2, 2' includes a port 8, 8' which as shown is fastened with a closure member 9, 9'. As illustrated closure members 9, 9' can be a simple bung formed of a resilient material or a screw-type cap, but other closure members could alternatively be used. Closure members 9, 9' can each be independently detached from their respective port 8, 8' to enable the respective reservoir 2, 2' to be refilled or topped up with anti-microbial liquid via the respective port 8, 8' or to be opened for cleaning or maintenance purposes. Optionally the closure member 9, 9' may be secured or is lockable to restrict access to reservoir 2, 2'.

The anti-microbial liquid 3, 3' can be any suitable liquid as discussed above. As illustrated, the hydrophilic sintered porous material 1 is in the form of a cylinder or other shape ergonomically selected for use and having a suitable thickness for example 2-4 mm. The section of the hydrophilic sintered porous material 1 between the reservoirs 2, 2' forms contact area whilst at least a portion of the two ends 1' are located within reservoirs 2, 2'.

Specifically, a first end 1' of the hydrophilic sintered porous material is located within lower reservoir 2' and a second end 1 of the hydrophilic sintered porous material is located within upper reservoir 2. The first lower end of the hydrophilic sintered porous material 1' (as shown in FIG. 4) extends from the first side of reservoir 2' across substantially the whole of the interior of reservoir 2'. Thus, this end 1' will remain in contact with the anti-microbial liquid 3' within reservoir 2' even when only a small quantity of the anti-microbial liquid 3' remains. The pore size of the hydrophilic sintered porous material 1', 1 is selected so that the anti-microbial liquid 3' can be conducted along the hydrophilic sintered porous material upwardly (i.e. against gravity) during normal use.

The hydrophilic sintered porous material 1 enters reservoir 2' via an opening and passes through reservoir sealing member 10' which is formed from a resilient material to provide a fluid-tight connection.

The upper end of the hydrophilic sintered porous material 1' (as shown in FIG. 4) of the hydrophilic sintered porous material cylinder extends into reservoir 2 via reservoir sealing member 10 and extends partly into the interior of reservoir 2. The pore size of hydrophilic sintered porous material 1', 1 is selected so that anti-microbial liquid 3 can be conducted along the hydrophilic sintered porous material downwardly (i.e. with gravity). Reservoir sealing member 10 is formed from a resilient material and provides a fluid-tight connection.

In use the anti-microbial liquid 3 permeates across the hydrophilic sintered porous material 1' so that the contact area is continually wetted by the anti-microbial liquid 3. The anti-microbial activity of liquid 3 immediately combats any micro-organism which is deposited on the contact area by a user, thus preventing any subsequent user inadvertently picking up live micro-organisms through use of the handle 20.

Figure 5:
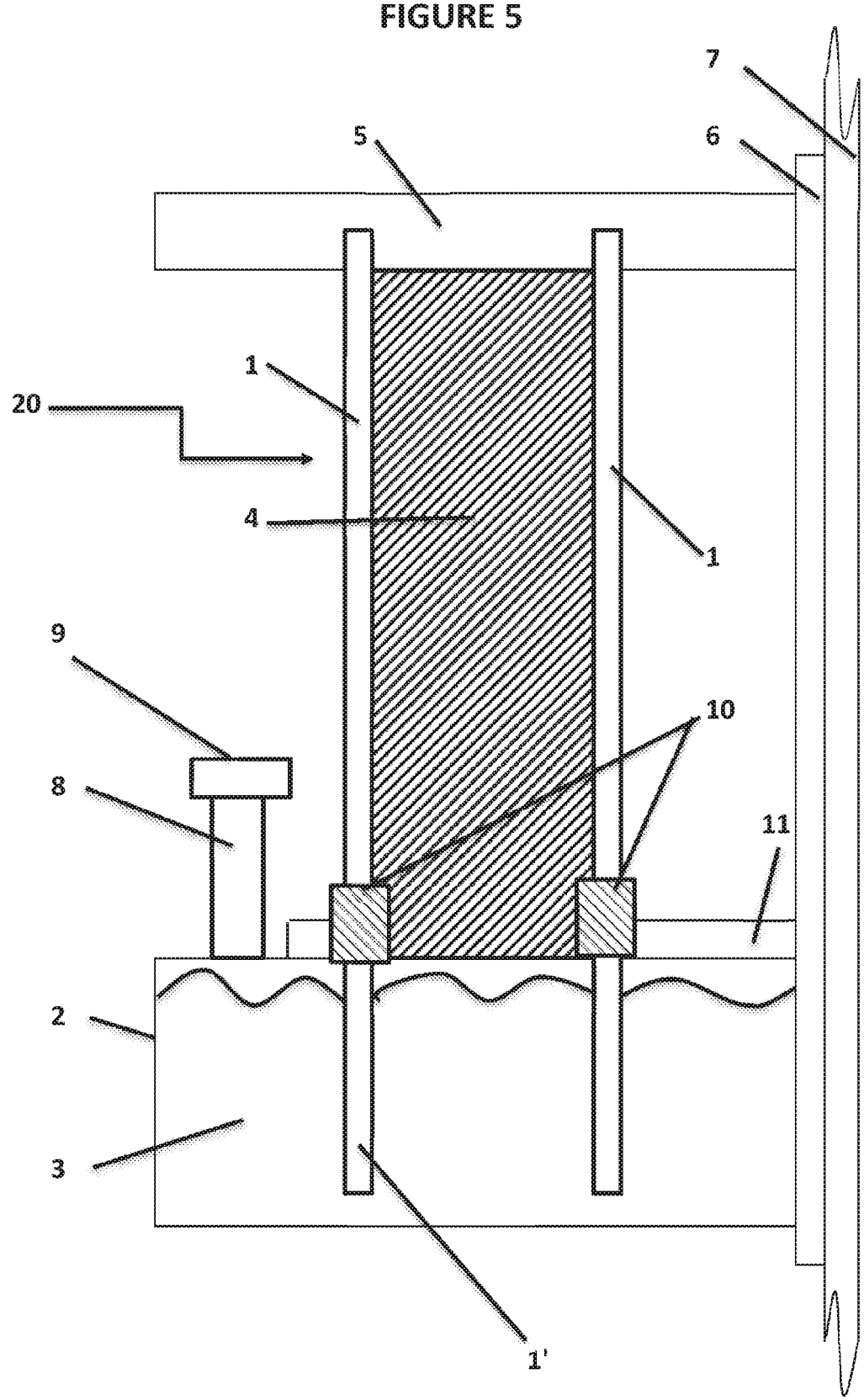
FIG. 5 is a cross-sectional view of a fifth embodiment of the invention in which the reservoir can be detached and replaced with a filled reservoir.

FIG. 5 shows a modification to the handle of FIG. 1 to allow the reservoir to be detached and replaced in a "cartridge-style" arrangement. As illustrated, reservoir 2 is releasably detachable from the handle 20. Handle 20 is shown mounted on a mounting surface 7 via an upper mounting or fixing bracket 6 together with a lower mounting or fixing bracket 11. The inclusion of the lower fixing bracket 11 allows reservoir 2 to be releasably detached from the handle 20, for example once liquid 3 has been depleted from reservoir 2. Accordingly an empty reservoir 2 can be removed from the handle 20 and either a replacement full reservoir (not shown) filled with anti-microbial liquid 3 can be attached to the handle 20 in its place (i.e. the reservoir 2 can be replaced in a "cassette"-type manner) or alternatively the removed reservoir 2 can be replenished more conveniently via port 8 as described above. Where the reservoir 2 is to simply be replaced by a filled reservoir (not shown), the port 8 and closure member 9 are not required and need not be present.

A handle according to the present invention was tested in the following, non-limiting example.

Example

Two door handle devices according to the present invention were tested to determine effective of bacterial control. Each door handle is steel framed, vertically aligned and encased with strips of plastic comprised of plastic globules sintered to form a porous material. Each handle includes a reservoir at its base for an antibacterial fluid that continuously wets the grip of the handle by transporting fluid across the plastic strips. The product is self-cleaning with no moving parts, power or pressurised containers.

Two sections of each handle tested had a rougher outer surface, whilst the other two sections of the handle had a smooth outer surface. Both handles were tested for the effect of an antiseptic solution (Dettol™) on colony forming unit counts vs a test solution (water). Non-parametric Kruskal-Wallis tests were carried out on data groups as data normality was not present nor could it be recovered. Where appropriate, summary statistics are given including, median, standard deviation and inter quartile range (IQR).

Two different culture media were compared (Baird Parker and Nutrient Agar) and no statistically significant differences were found (p=0.06). No difference was found between the rough and smooth sections of the device for cfu counts (p=0.98). Statistically, the device with antiseptic solution is statistically significantly better than the control (p=9.6E-7).

Method

The two handles (control unit 1 & test unit 2) were secured on the urine bench in a clinical microbiology laboratory and all four strips covering the handle were cleaned with an alcohol wipe. The reservoir in control unit 1 was filled with sterile distilled water and household antiseptic (Dettol™: Reckitt Benkiser Ltd, Slough, UK) was used for test unit 2. Dettol™ contains chloroxylenol and benzalkonium chloride. The liquids were allowed to diffuse up the strips. The strips were sampled at Time=0 (9 am) using double-sided dipslides (Hygiena International, Watford, UK). Dipslides were coated with nutrient and Baird-Parker agars so that two of the four strips per handle were sampled with each type of agar. Each slide was pressed against the strip for 3-5 seconds before incubation at 350 C for 48 hrs. Sampling was repeated at one, two, four, eight, 12, 24, and 48 hours after sampling at T=0.

Microbiology staff members were asked to grasp each handle with unwashed hands for 3 seconds every time they passed the handles during the working day; one handle with the right hand and the other with the left. Staff swapped hands for repeated handling. The complete 48 hr cycle was repeated three times, with units repositioned to take account of bias from the dominant hand.

Total bioburden for each strip was assessed for number of aerobic colony forming units (cfu), with colonies on both agar types investigated for possible *Staphylococcus aureus*. Coagulase-positive colonies were confirmed as *S. aureus* according to standard laboratory protocol (see Adams et al., J Hosp Infect (2017) 95: 378-385).

The total average bioburden for each handle was calculated and compared between control and test units.

Results

Each experiment produced similar data, in that the control handle rapidly acquired mixed bioburden, including *S. aureus*, whereas the test unit remained relatively uncontaminated (p=9.6E-7). Median cfu counts were 5.35 for the test unit 2 vs 0 (zero) for the control unit. There was no difference in yield or isolation of *S. aureus* between the two different culture media. Bioburden diminished from 24-48 hours for the control unit without obvious cause, although it is possible that there was staff handling fatigue or complacency. The reservoirs still contained fluid at the completion of each 48 hour test.

Culture Over Time

Figure 6:
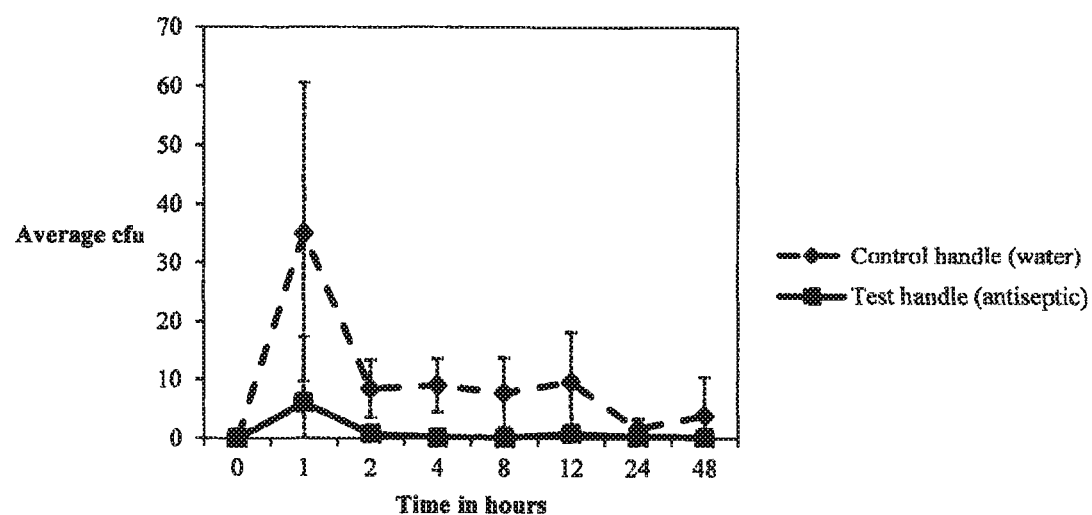
FIG. 6 is a plot of average cfu values against time for the door handles as tested in the example.

Average cfu values were plotted against time for each door handle independent of roughness or culture media. FIG. 6 shows the average bioburden on the test and control handles over a 48 hour period. Standard deviations are given to show distribution of values, and error bars show one standard deviation from the mean.

Over time, the test device increases efficacy to maximum of 99.04% difference with respect to control which begins to stabilize at 90% after 2 hours before oscillating. Table 1 shows average cfu counts over time for both tested devices regardless of roughness.

TABLE 1

Average cfu counts split by device type. 5 difference and log reductions Average

| Time | Unit | cfu | Unit | cfu | % difference |
|---|---|---|---|---|---|
| 0 | Water | 0 | Dettol | 0 | 0 |
| 1 | Water | 35.15 | Dettol | 6.075 | 82.71693 |
| 2 | Water | 8.5 | Dettol | 0.85 | 90 |
| 4 | Water | 9.025 | Dettol | 0.175 | 98.06094 |
| 8 | Water | 7.825 | Dettol | 0.075 | 99.04153 |
| 12 | Water | 9.675 | Dettol | 0.9 | 90.69767 |
| 24 | Water | 1.725 | Dettol | 0.25 | 85.50725 |
| 48 | Water | 4 | Dettol | 0.175 | 95.625 |

Culture Media Comparison

Figure 7:
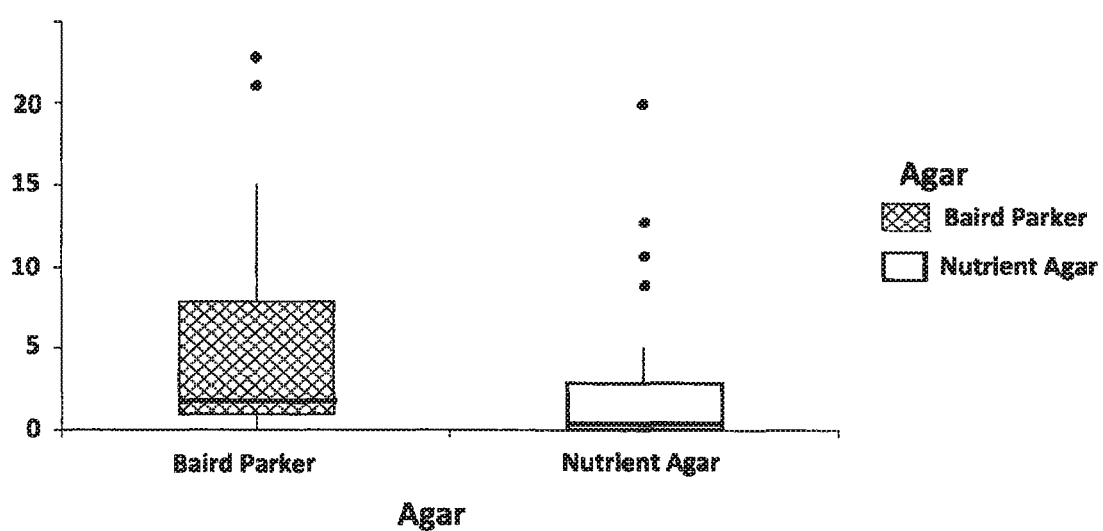
FIG. 7 is a boxplot showing cfu counts split by culture media.

Baird Parker and Nutrient Agar show a positive correlation of 0.89 based on Kendal-Tau pairwise correlation. Additionally, no statistical difference was found between groups p=0.06 but this must be seen in a cautious light. FIG. 7 shows boxplots of cfu count based on culture media, depicting wider inter quartile range for Baird Parker (9.35 vs 3.25). Median counts are statistically similar (1.15 cfu vs 0.15 cfu) but Baird Parker tends to have a wider spread of values (standard deviation=14.3 vs 5.17).

Detection of S. *Aureus*

Figure 8:
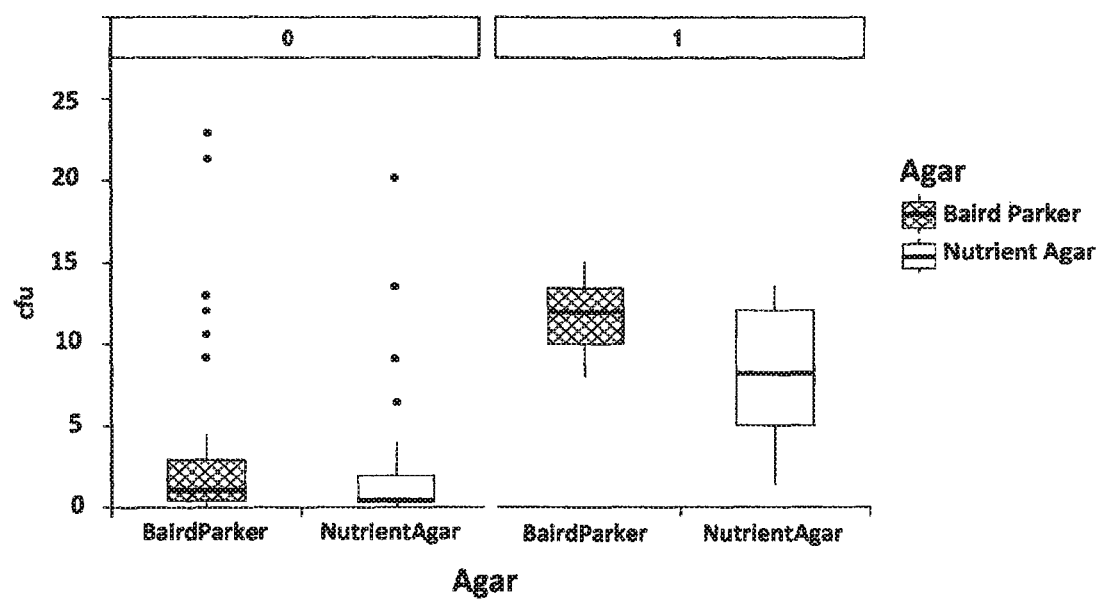
FIG. 8 is a boxplot depicting cfu counts categorised by culture media and *S. aureus* detection (1) of none (0).

No statistical difference (p=0.1) was found for the detection of S. *aureus* between both nutrient agars. The boxplot of FIG. 8 shows similar distributions for cfu counts based on detection of S. *aureus* (1) or none (0).

Rough v Smooth Surface Finish

Figure 9:
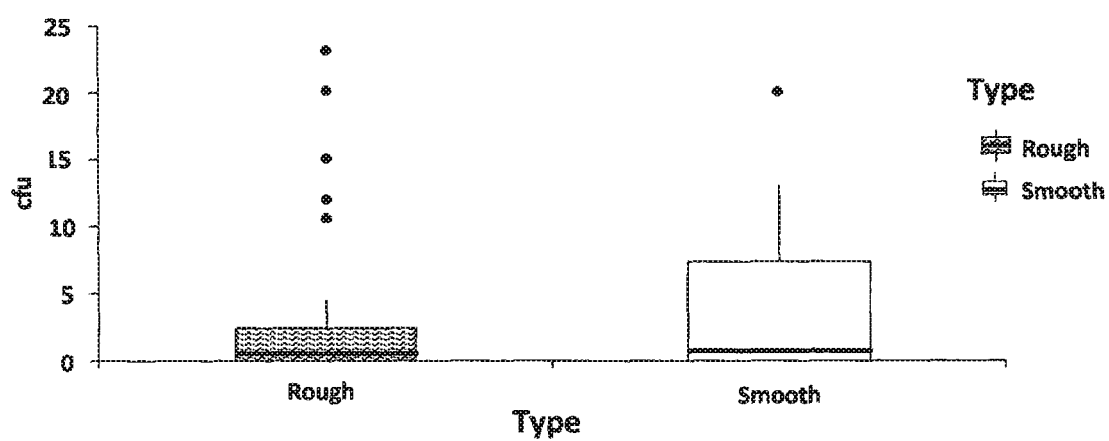
FIG. 9 is a boxplot showing the distribution of cfu counts categorised by devioce surface type: rough v smooth.

No statistical difference was found between median counts of cfu for rough and smooth devices (p=0.98). However, the smooth device tended to have a much higher spread of cfu counts (IQR=8.8 cfu vs 2.7 cfu). FIG. 9 shows boxplots, depicting this distribution.

Control v Test

Figure 10:
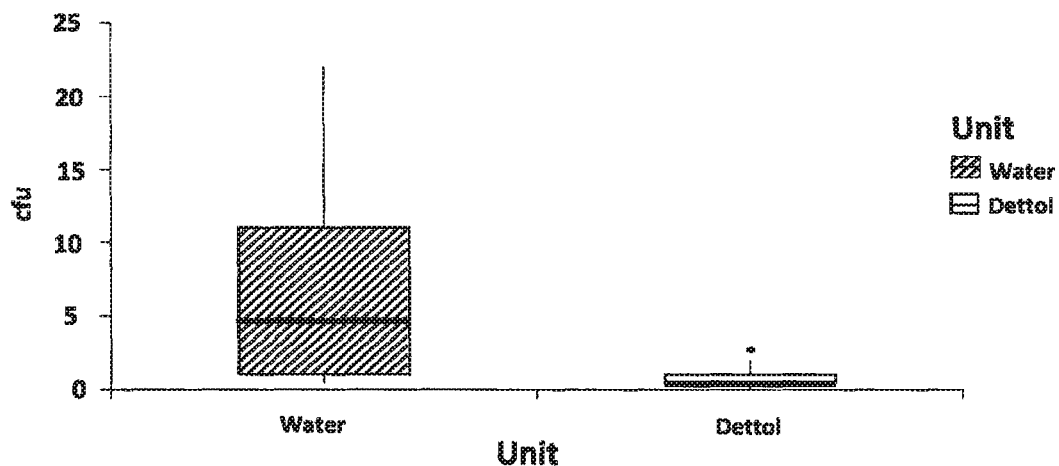
FIG. 10 is a boxplot showing the distribution of cfu counts for both handles tested in the example for water and Dettol.

Colony forming unit counts were significantly affected by antiseptic solution (p=9.6E-7). Median cfu counts were 5.35 for the Dettol device vs 0 (zero) for water. Standard deviations were (14 vs 4). FIG. 10 shows the distribution of cfu counts for both the test device and the control device independent of culture media and device roughness.

Figure 11:
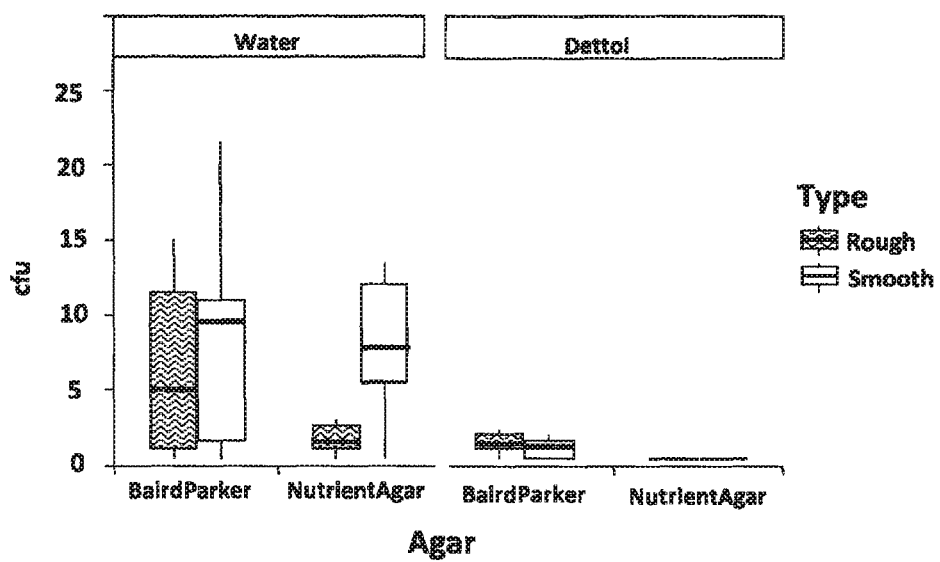
FIG. 11 is a boxplot of cfu counts for both test and control devices categorised by roughness and culture media.

FIG. 11 shows boxplots of cfu counts split up by nutrient agar, unit roughness and unit type (Water vs Dettol™).

Conclusion

The test handle clearly inhibited contamination from hands during routine duties in a microbiology laboratory. The example shows that the antiseptic protected the strips—and thus the handle—from accumulating bioburden, with the potential for reducing the risk of onward transmission to sequential hands touching the unit. Since the antiseptic could (just) be detected on hands after touching, it may well act as an additional hand hygiene agent. Use of these door handles in the healthcare environment offers the possibility of ensuring hand hygiene compliance in most hospitals. Antimicrobial door handles would also reduce microbial contamination from patient and visitor hands, depending upon areas employed. Alternatives to Dettol™ include chlorhexidine or desalinated electrolysed water, amongst others. Given the nature of the leading pathogens in hospitals nowadays, an antiseptic active against norovirus and *Clostridium difficile* would be of much interest, and preferable to alcohol.

The invention claimed is:

1. A handle comprising:
   i. a contact area which is at least substantially formed of a hydrophilic sintered porous material, and wherein the hydrophilic sintered porous material is a substantially non-compressible material; and
   ii. a reservoir for holding an anti-microbial liquid, wherein, in use, said reservoir is fluidically connected to the contact area by the hydrophilic sintered porous material extending into the reservoir and contacting said liquid.

2. The handle as claimed in claim 1 wherein said sintered material is formed from sintering beads of 20 to 200 µm diameter.

3. The handle as claimed in claim 1, wherein said hydrophilic sintered porous material is non-compressible by a compressive force of 1 MPa.

4. The handle as claimed in claim 1 wherein the hydrophilic sintered porous material is plastic or stainless steel.

5. The handle as claimed in claim 1 wherein the hydrophilic sintered porous material has a pore size of 0.1 to 200 µm.

6. The handle as claimed in claim 1 wherein the hydrophilic sintered porous material is able to draw the anti-microbial liquid across at least part of its surface in an even delivery to the outer surface to maintain a consistently disinfected contact area.

7. The handle as claimed in claim 1 wherein the reservoir is sealable so that the anti-microbial liquid can only exit the reservoir through the hydrophilic sintered porous material.

8. The handle as claimed in claim 1 wherein the reservoir is configured to be re-filled with anti-microbial liquid by means of a sealable port.

9. The handle as claimed in claim 1 wherein the anti-microbial liquid has a dynamic (absolute) viscosity of 0.0008 to 0.003 $Ns/m^2$.

10. The handle as claimed in claim 1 wherein the reservoir includes an indicator means which shows the level of anti-microbial liquid within the reservoir.

11. The handle as claimed in claim 1 wherein the reservoir is releasably detachable from the handle.

12. The handle as claimed in claim 1 wherein the handle is configured to be mounted in a detachable manner.

13. The handle as claimed in claim 1 containing anti-microbial liquid within the reservoir.

14. A handle as claimed in claim 1 wherein the anti-microbial liquid inhibits the growth of culture forming units on the contact area of the handle.

15. A kit, said kit comprising:
   i. a handle as claimed in claim 1; and
   ii. an anti-microbial liquid suitable to be held within the reservoir and which is able to permeate through at least part of the hydrophilic porous material when in fluid connection therewith.

16. The kit as claimed in claim 15 wherein the reservoir is releasably detachable from the handle.

17. The kit as claimed in claim 15 wherein the handle is configured to be mounted in a detachable manner.

18. A kit as claimed in claim 15 wherein said sintered material is formed from sintering beads of 20 to 200 µm diameter.

19. A kit as claimed in claim 15 wherein said hydrophilic sintered porous material is non-compressible by a compressive force of 1 MPa.

20. A kit as claimed in claim 15 wherein the reservoir is sealable so that the anti-microbial liquid can only exit the reservoir through the hydrophilic sintered porous material.

* * * * *